United States Patent
Chianura et al.

(10) Patent No.: US 12,117,332 B2
(45) Date of Patent: Oct. 15, 2024

(54) MACHINE TO FILL AND WEIGH CONTAINERS AND CORRESPONDING WEIGHING METHOD

(71) Applicant: I.M.A. INDUSTRIA MACCHINE AUTOMATICHE S.P.A., Ozzano dell'Emilia (IT)

(72) Inventors: Mattia Chianura, Ozzano dell'Emilia (IT); Claudio Trebbi, Ozzano dell'Emilia (IT)

(73) Assignee: I.M.A. INDUSTRIA MACCHINE AUTOMATICHE S.P.A., Ozzano dell'Emilia (IT)

( * ) Notice: Subject to any disclaimer, the term of this patent is extended or adjusted under 35 U.S.C. 154(b) by 471 days.

(21) Appl. No.: 17/622,939

(22) PCT Filed: Jul. 21, 2020

(86) PCT No.: PCT/IT2020/050181
§ 371 (c)(1),
(2) Date: Dec. 27, 2021

(87) PCT Pub. No.: WO2021/014476
PCT Pub. Date: Jan. 28, 2021

(65) Prior Publication Data
US 2022/0244090 A1    Aug. 4, 2022

(30) Foreign Application Priority Data

Jul. 22, 2019    (IT) .................. 102019000012513

(51) Int. Cl.
*G01G 11/04*    (2006.01)
*B65B 1/32*    (2006.01)
(Continued)

(52) U.S. Cl.
CPC ............. *G01G 15/006* (2013.01); *B65B 1/32* (2013.01); *B65B 43/46* (2013.01); *B65B 43/52* (2013.01); *G01G 11/04* (2013.01)

(58) Field of Classification Search
CPC ........... B65B 1/32; B65B 43/46; B65B 43/52; G01G 15/00; G01G 15/006; G01G 11/003; G01G 11/04
(Continued)

(56) References Cited

U.S. PATENT DOCUMENTS 5,004,093 A * 4/1991 Blezard .................. B65B 43/46
177/52
5,092,414 A * 3/1992 Blezard ................. G01G 15/00
177/52
(Continued)

FOREIGN PATENT DOCUMENTS

EP    2427744    3/2012

OTHER PUBLICATIONS

International Search Report and Written Opinion corresponding to International Patent Application No. PCT/IT2020/050181, mailed Nov. 3, 2020.

*Primary Examiner* — Randy W Gibson
(74) *Attorney, Agent, or Firm* — MCANDREWS HELD & MALLOY, LTD

(57) ABSTRACT

A machine to fill and weigh containers (100) is described, comprising at least one movement device (18) configured to transport one or more containers (100) between at least two work stations (12) disposed in a work direction (F) which defines a movement path between said at least two work stations (12), wherein along the movement path at least one weighing device (17) is present to acquire the measurement of the mass of said one or more containers (100). A method
(Continued)

to weigh the containers (100) is also described, actuated in the machine to fill and weigh containers as above.

15 Claims, 6 Drawing Sheets

(51) Int. Cl.
*B65B 43/46* (2006.01)
*B65B 43/52* (2006.01)
*G01G 15/00* (2006.01)

(58) Field of Classification Search
USPC .......................................................... 177/145
See application file for complete search history.

(56) References Cited

U.S. PATENT DOCUMENTS

| | | | | | |
|---|---|---|---|---|---|
| 5,236,337 | A | * | 8/1993 | Kikuchi | G01G 15/00 |
| | | | | | 177/52 |
| 6,096,983 | A | * | 8/2000 | Ozaki | G01G 15/00 |
| | | | | | 141/172 |
| 6,800,818 | B2 | * | 10/2004 | Balboni | B67C 3/202 |
| | | | | | 177/52 |
| 11,193,812 | B2 | * | 12/2021 | Derrick | G01G 11/003 |
| 2017/0081052 | A1 | * | 3/2017 | Aichinger | B65G 43/08 |
| 2019/0152724 | A1 | | 5/2019 | Philipp et al. | |

\* cited by examiner

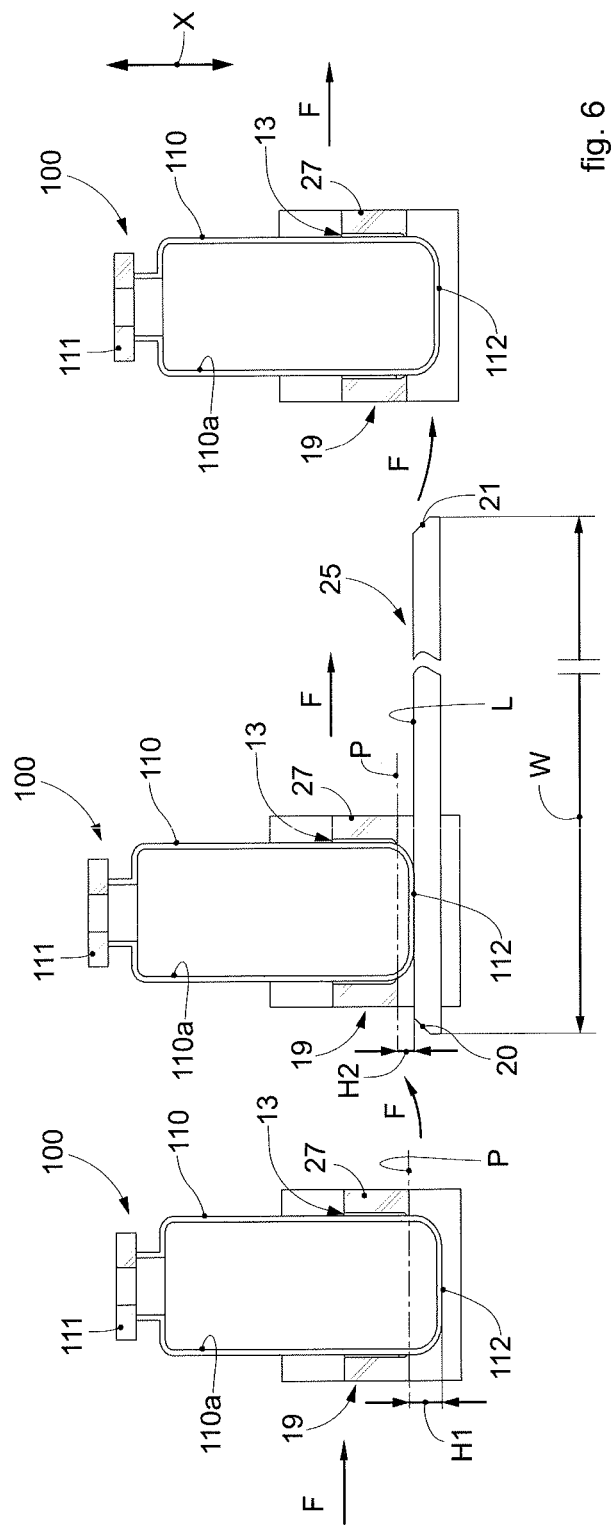
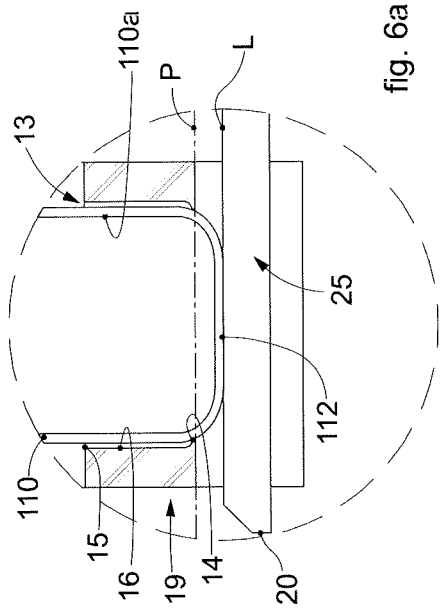

MACHINE TO FILL AND WEIGH CONTAINERS AND CORRESPONDING WEIGHING METHOD

FIELD OF THE INVENTION

The present invention concerns a machine to fill and weigh containers that are automatically moved in a work direction from and to one or more work stations, among which one or more weighing devices to measure the weight of the containers can be present, without stopping their movement from one station to the next.

In particular, the containers are configured to contain various types of products, both fluid and solid and in powder form, for example drugs, food, or beverages. Furthermore, the transport of each container, or group of containers, occurs independently, with no constraint in its direction, and possibly neither in its path, in a safe and clean environment, by means of devices and apparatuses that require human intervention reduced to a minimum, or close to zero.

The present invention also concerns the corresponding method to weigh the containers as above.

BACKGROUND OF THE INVENTION

In the industrial field of automated filling of containers, machines to fill and weigh containers are known, often provided with transport devices to automatically transport one or more containers from and to one or more work stations, which include for example a filling station and one or more weighing stations, many of which have been designed, manufactured and marketed by the Applicant.

The containers can have different shapes and sizes, from small vials for medicines, with a capacity of a few milliliters, to more capacious containers, with a capacity greater than one liter, able to contain fluid products, in particular liquids, or solids or in powder form.

Normally, known filling and weighing machines comprise a plurality of work stations, such as for example a storage station for the empty containers, a possible first weighing station for each empty container, a station to fill the containers, a second station to weigh each filled container, a station to close each container and a station to pack, or package, the filled containers, ready for delivery, or for storage in a warehouse of finished products.

One of the important aspects in such filling and weighing machines, but not only in them, is the need to weigh the containers, individually, or grouped together, before they are filled, possibly during the filling step and/or after they have been filled. Moreover, especially in certain sectors, such as for example the pharmaceutical one, each weighing, to verify the correct dosage, must be very accurate and precise, with tolerances even in the range of one milligram.

The weighing stations, usually associated with the filling stations and being disposed in a corresponding or neighboring zone, are generally equipped with one or more weighing units which receive the container or group of containers to be weighed from a movement device, for example, automated and possibly robotic, perform the weighing operation and finally make the container or group of containers available to another, or possibly the same, movement device that picks them up in order to move them to the next work station.

The need to position the containers on the weighing unit on each occasion and to pick them up at the end of the weighing operation decreases the overall productivity of the machine.

This method can therefore be rather slow, and the continuous passes of containers held by the movement devices and released and deposited on the weighing unit and vice versa, as well as slowing down the production flow, can cause product spills or damage to the container, as well as possible errors in measuring the weight.

There is therefore a need to perfect a machine to fill and weigh containers and a corresponding weighing method which can overcome at least one of the disadvantages of the state of the art.

In particular, one purpose of the present invention is to provide a machine to fill and weigh containers which allows to reduce the time required to weigh the containers and, at the same time, increases the overall productivity of the machine.

Another purpose of the present invention is to provide a machine to fill and weigh containers which allows to reduce the minimum operations necessary to weigh them.

Another purpose of the present invention is to perfect a method to weigh the containers as above which takes place without slowing down and/or stopping the moving containers and which is moreover simple, rapid, precise and above all reliable.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the invention or variants to the main inventive idea.

In accordance with the above purposes, a machine to fill and weigh containers comprises at least one movement device configured to transport one or more containers between at least two work stations disposed in a work direction which defines a movement path between the two work stations. At least one of the work stations is suitable to fill the containers.

In accordance with one aspect of the present invention, along the movement path as above there is at least one weighing device comprising a weighing plate and configured to acquire the measurement of the mass of the one or more containers on the weighing plate.

The least one movement device comprises at least one gripping member configured to support and hold, preferably in a stable manner, the one or more containers along the movement path.

In accordance with one aspect of the present invention, the movement device is configured to be moved without interruption in the work direction while the containers are weighed, supported by the gripping member on the weighing plate, the gripping member. In doing so, the gripping member is disposed at a weighing distance with respect to the weighing plate such as to allow, during the weighing, a release of the one or more containers with respect to the gripping member that holds them in a release direction that is substantially perpendicular with respect to a support plane comprised in the weighing plate. Furthermore, the gripping member is configured to apply a thrust in the work direction against the one or more containers supported by it, during the weighing of the containers.

The at least one movement device is therefore configured to transport the one or more containers as above by means of the at least one gripping member in the work direction so that the one or more containers are thrust by the gripping member in such direction while they are weighed.

In accordance with some embodiments, the movement device is configured to move at a constant speed during the weighing of the one or more containers as above.

In accordance with some embodiments, the support surface of the weighing plate has a predefined length sufficient to allow the acquisition of the measurement of the mass of the containers while they are moved without interruption on the support surface by the movement device.

In accordance with some embodiments, the release direction is substantially vertical and the release of the one or more containers occurs by lifting them with respect to the gripping member.

According to another aspect of the present invention there is also provided an assembly to fill and weigh containers, comprising one or more containers, at least one movement device configured to transport the containers along a movement path between at least two work stations, and provided with at least one gripping member configured to support and hold the containers along the movement path, and at least one weighing device comprising a weighing plate disposed along the movement path and configured to acquire the measurement of a mass during a weighing step.

In particular, the movement device is configured to transport the containers between the two work stations as above which are disposed in a work direction that defines a movement path between the two work stations, wherein at least one work station is suitable to fill the containers.

According to one aspect, the movement device is configured to be moved without interruption in the work direction while the weighing of the containers is carried out, supported by the gripping member on the weighing plate, the latter cooperating with a base end of the containers so that during the weighing the containers are released by the gripping member in a release direction that is substantially perpendicular to a support plane of the weighing plate. The gripping member is configured and moved to apply a thrust in the work direction against the containers supported by it during the weighing of the containers, obtained while the movement device moves without interruption on the weighing plate.

According to some embodiments, the weighing plate is disposed and configured to lift the container during the weighing from a first height, defining a first distance between the base end and a holding plane of the gripping member, to a second height, smaller than the first height, defining a second distance between the base end and the holding plane.

According to another aspect of the present invention, a method is provided to weigh containers in a machine to fill and weigh containers. The method provides a step of moving the one or more containers, each having a respective base end, by means of a respective movement device, between at least two work stations disposed in the work direction that defines the movement path between the two work stations, at least one of which is suitable to fill the containers. During the movement, the one or more containers are held by at least one gripping member of the movement device.

The method also comprises a step of weighing, by means of a weighing device disposed along the movement path, the one or more containers as above, making them advance along the movement path on a weighing plate of the weighing device. According to one aspect of the method, in the weighing step, the one or more containers supported by the gripping member are moved without interruption in the work direction by means of the movement device and such one or more containers cooperate with the weighing plate as above so that during the weighing they are released by the gripping member in a release direction that is substantially perpendicular to a support plane of the weighing plate, so as to acquire the measurement of the mass while the one or more containers are made to advance without interruption on the weighing plate in the work direction. Furthermore, during the weighing step it is provided that the gripping member thrusts the one or more containers supported by it in the work direction as above during the weighing of the containers, obtained while the movement device moves without interruption on the weighing plate.

ILLUSTRATION OF THE DRAWINGS

These and other aspects, characteristics and advantages of the present invention will become apparent from the following description of some embodiments, given as a non-restrictive example with reference to the attached drawings wherein:

FIG. 6 is a section of FIG. 2;

Figure 1:
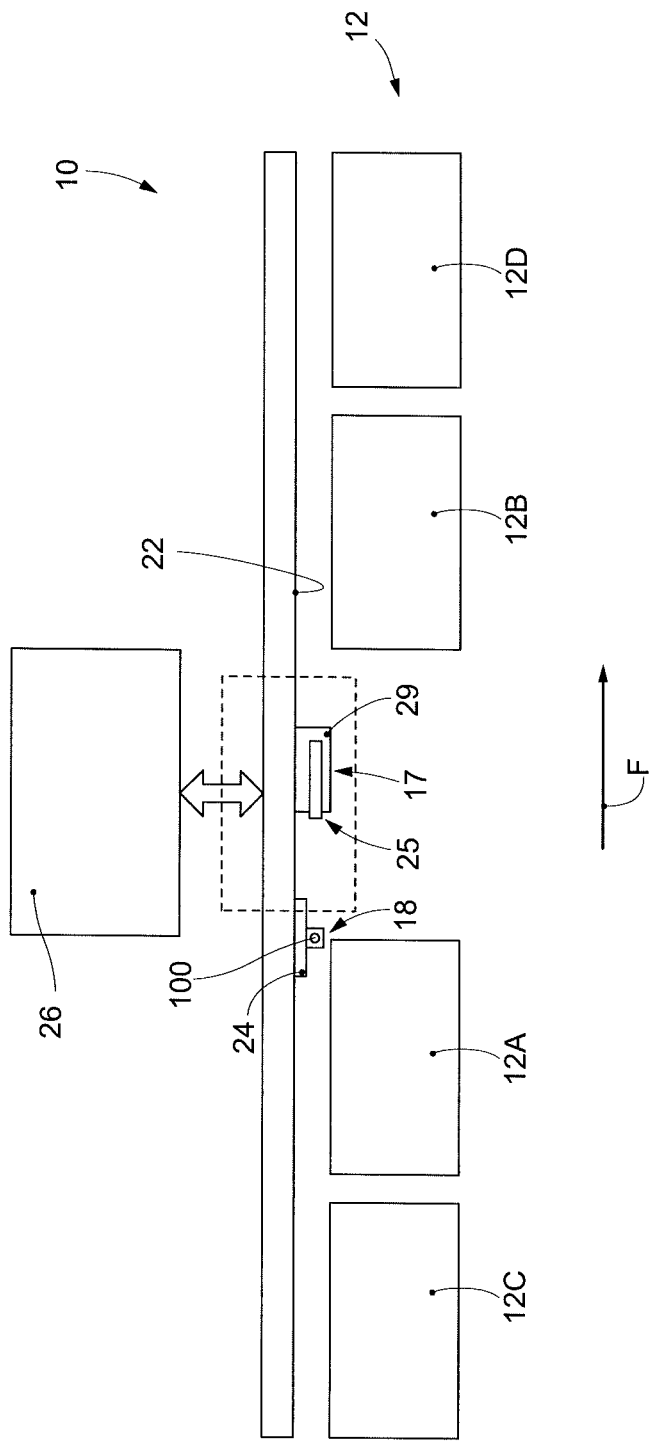
FIG. 1 is a block diagram showing a machine to fill and weigh containers in accordance with embodiments described here, provided with a vertical reference surface and in which a weighing zone, provided between a first work station and a second work station, is delimited with a dashed line.
Figure 7:
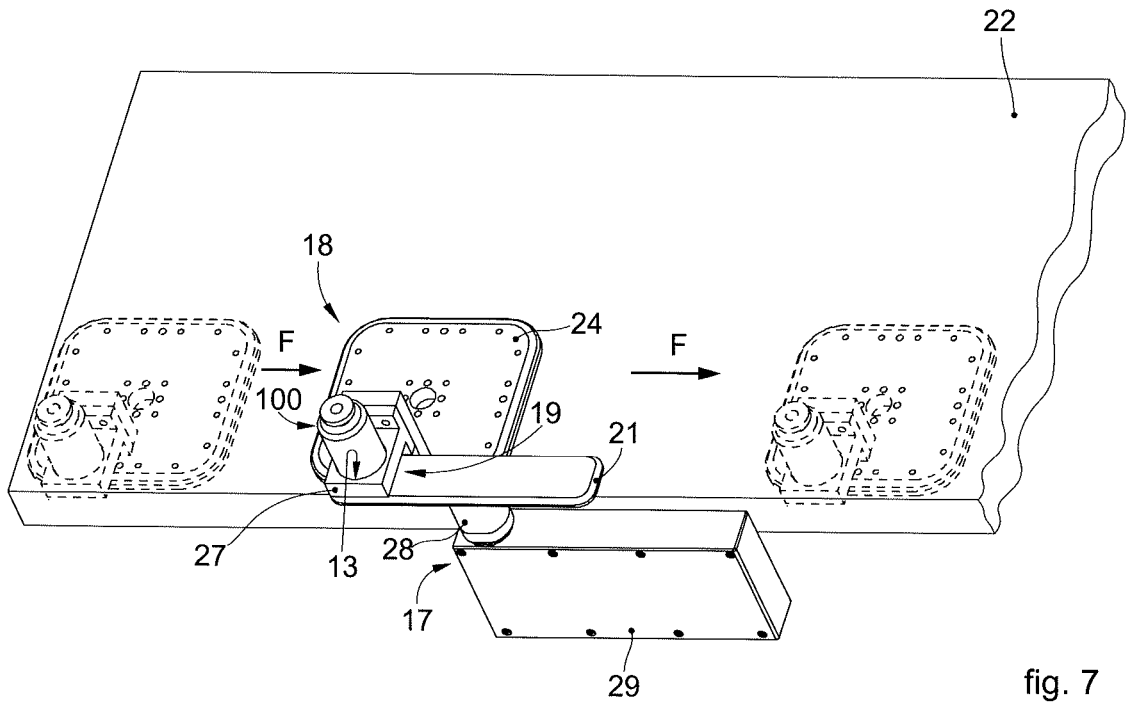
Figure 8:
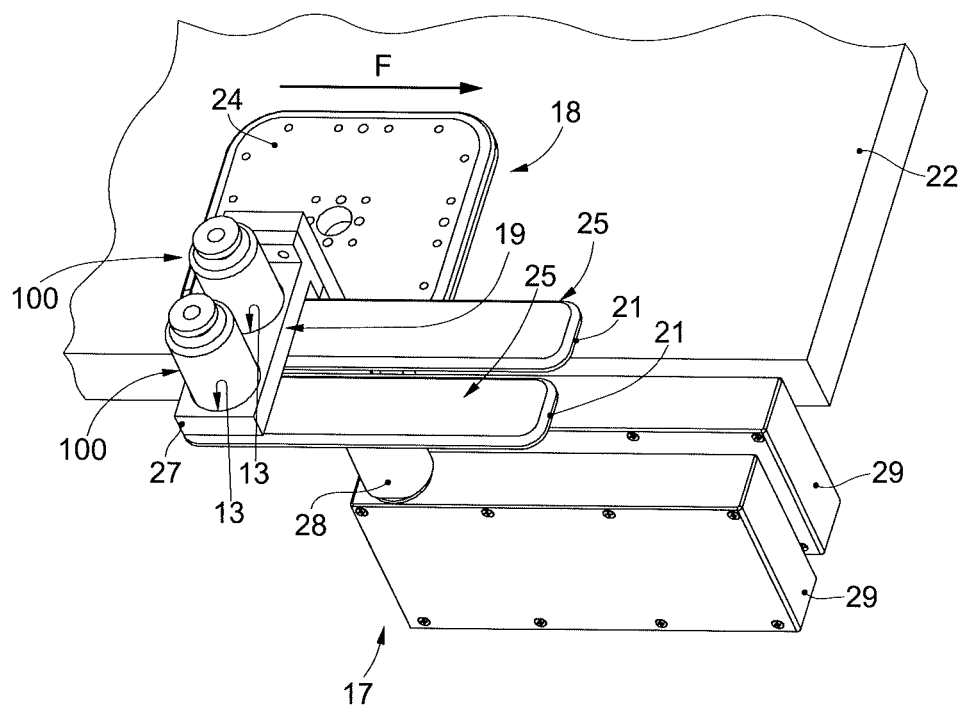
Figure 9:
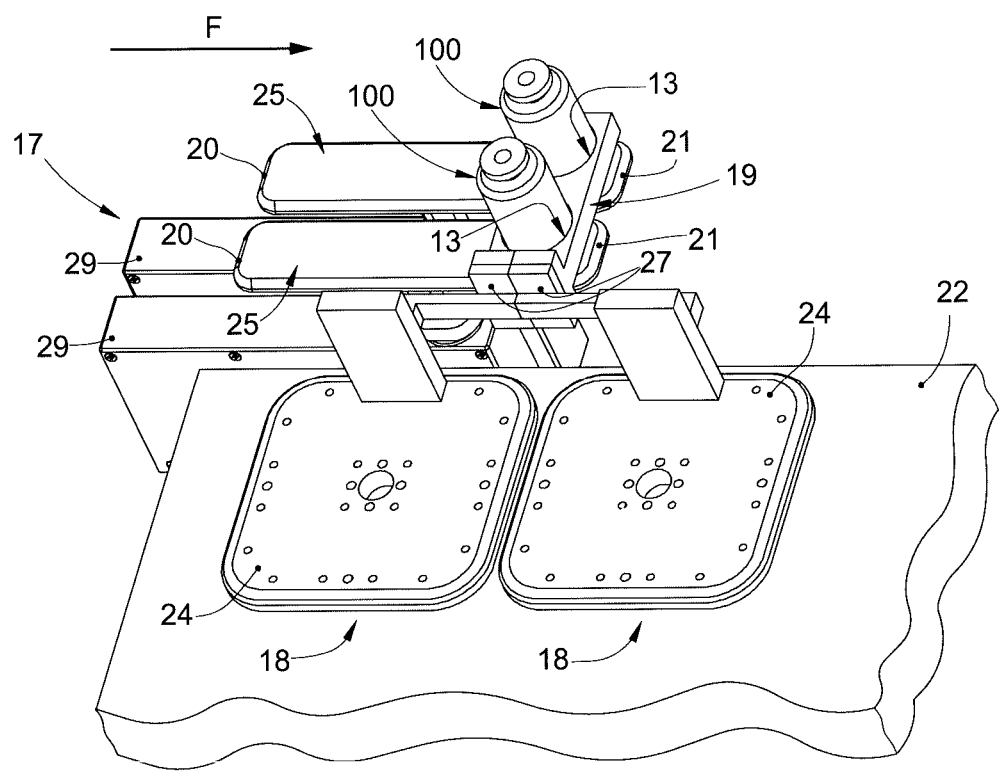

FIG. 6*a* is an enlarged detail of FIG. 6;

FIGS. 7-9 are perspective views of the weighing zone of FIG. 1, in accordance with embodiments described here, in which the reference surface of the machine is positioned with a horizontal orientation.

To facilitate comprehension, the same reference numbers have been used, where possible, to identify identical common elements in the drawings. It is understood that elements and characteristics of one embodiment can conveniently be incorporated into other embodiments without further clarifications.

DESCRIPTION OF SOME EMBODIMENTS

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Embodiments described using the attached drawings concern a machine to fill one or more containers 100 with one or more products and to weigh them, indicated as a whole with reference number 10 in FIG. 1.

In accordance with some embodiments, the products with which to fill the containers 100 can be fluid products, in particular liquids, or solid or powdered products, or gels, or also in granular, tablet, pill, bar or similar form, or a combination thereof, for example drugs, dietary supplements, food stuff, or beverages.

In particular, the containers 100 in question here can have different shapes, sizes and therefore containing capacities, from just a few milliliters to a number of liters. For example, containers can be provided that have the shape of a small vial for drugs with an external diameter of the order of millimeters and a capacity of the order of milliliters, for example from 1 to 100 milliliters, containers that have the shape of a vial with an external diameter of the order of centimeters and a capacity of the order of centiliters, for example from 1 to 100 centiliters, or also containers that have the shape of a vial, a syringe or a Carpule®, with a capacity of the order milliliters, for example from 1 to 100 milliliters.

In accordance with some embodiments, the machine 10 is provided with at least one movement device 18 configured to transport one or more containers 100 between at least two work stations 12 disposed in a work direction F which defines a movement path between the two work stations 12 as above.

At least one of the work stations 12 is suitable for filling the containers 100 with one or more of the products as above.

In accordance with one aspect of the present invention, along the movement path there is at least one weighing device 17 for acquiring the measurement of the mass of the one or more containers 100 on a weighing plate 25 of the weighing device 17.

The acquisition of the measurement of the mass is carried out while the one or more containers 100 are made to advance without interruption on the weighing plate 25, in contact with the latter, in the work direction F.

The at least one movement device 18 comprises at least one gripping member 19 configured to support and hold, in particular in a stable manner, the one or more containers 100 along the movement path.

The weighing plate 25 is configured and disposed to cooperate with the one or more containers 100 moved by the movement device 18, so as to determine a release of the one or more containers 100 by the at least one gripping member 19 in a direction substantially perpendicular to a plane on which the weighing plate 25 lies, in the example in a vertical direction with respect to a substantially horizontal holding plane P of the one or more containers 100.

In particular, the weighing plate 25 is configured to determine a release of the one or more containers 100 by the at least one gripping member 19 in a release direction X so that the one or more containers 100 rest completely on the weighing plate 25, while they are held by the at least one gripping member 19 in a direction parallel to the work direction F, so that the one or more containers 100 are guided in the advancement while they are weighed.

The weighing of the containers 100 therefore occurs while they are positioned slidingly in contact with the weighing plate 25, thanks to the thrust action exerted in the work direction F by the gripping member 19 against the containers 100.

This allows to obtain, advantageously, a measurement of the mass of the containers 100 which is reliable and precise while the containers 100 are moved without interruption in the work direction F. This is possible because on the one hand the gripping member 19 continues to exert a constraining action on the containers 100 in the work direction F, but on the other hand it ceases to exert any constraint in the release direction X, since these holding constraints could influence the measurement of the mass and falsify, at least in partly, the measurement itself.

In particular, the movement device 18 is configured to transport the one or more containers 100 by means of the at least one gripping member 19 in the work direction F so that the one or more containers 100 while they are weighed.

In accordance with some embodiments described here, the machine 10 comprises a reference surface 22 in association with which the one or more work stations 12 as above are disposed, and in association with which the one or more movement devices 18 provided operate. In particular, the reference surface 22 can be either vertical, as in FIGS. 2-5, or horizontal, as in FIGS. 7-9, or a combination of vertical and horizontal, or also flat, or also inclined by a desired angle, or a combination of inclined surfaces, or curved, undulated, or also irregular and can, in some embodiments, also have any geometric discontinuity whatsoever.

In accordance with possible embodiments, shown in FIG. 1, the work stations 12 can comprise a first station 12A, used for filling the containers 100 with one or more of the products as above, and a second station 12B used for closing/sealing the containers 100. The first work station 12A is disposed upstream of the second work station 12B in the work direction F and between them the at least one weighing device 17 is present.

In accordance with a different embodiment, the weighing device 17 can be disposed upstream of the first station 12A used for filling the containers 100, and it is also possible to have two weighing devices 17, respectively upstream and downstream of the first station 12A used for filling containers 100.

Optionally, although not necessarily, the machine 10 can comprise other work stations 12C, 12D disposed, depending on the function they perform, upstream or downstream of the first work station 12A and of the second work station 12B.

In the example of FIG. 1, the machine 10 can comprise a station 12C to store the empty containers 100 which is disposed upstream of the first work station 12A, and a packaging station 12D configured to package, or pack, the filled and closed containers 100 disposed downstream of the second work station 12B. Possibly, the machine 10 can comprise other work stations 12 such as for example a storage station configured to store the packages, or packs, of containers 100 ready for use.

It should be noted that the number and disposition of the work stations 12, which in FIG. 1 are shown aligned along a rectilinear path, are described and represented schematically here only by way of example and to better explain the present invention. In fact, the disposition of the work stations 12 can be chosen at will as a function of the operational production requirements.

Such work stations 12 are disposed one after the other in the work direction F which defines the main direction of development of the machine 10. This work direction F defines a path between the work stations 12 which is not necessarily represented by a straight line, but it can also be a curve or a segment of a curve, for example, a circle, an ellipse or other curve, or part thereof.

In accordance with some embodiments of the movement device 18, described with reference to FIGS. 6 and 6a, the at least one gripping member 19 of each movement device 18 is provided with at least one holding seating 13 with an aperture 14 through which a part of each of the containers 100 protrudes downward, wherein the weighing plate 25 is configured and disposed to support the protruding part of the container 100 when the gripping member 19 supporting the containers 100 is moved without interruption on the weighing plate 25. More particularly, the protruding part of each container 100 can be identified as the base end 112 with which each container 100 is provided, as will be evident from the following description of an example embodiment of the containers 100 to be weighed.

In particular, the holding seating 13 has the aperture 14 on the bottom and an upper aperture 15 opposite said aperture 14, the latter configured to receive the container 100. The upper aperture 15 has a passage gap greater than the aperture 14, FIG. 6a.

The upper aperture 15 has, in particular, a transverse size correlated to a transverse size of the container 100, to allow it to enter the holding seating 13. In particular, the transverse size of the upper aperture 15 is slightly greater than the corresponding transverse size of the container 100, with the aim of preventing the latter from oscillating during movement.

The aperture 14, on the other hand, has a transverse size correlated to a transverse size of the base end 112 of the container 100 to allow the container 100 to partly protrude downward, although it is held by interference in said holding seating 13.

The holding seating 13 has, between the upper aperture 15 and the aperture 14, a lateral surface 16 configured to limit the oscillatory movement of the container 100 during its movement between the work stations 12 and to axially hold the container 100, thus preventing unwanted movements thereof that are transverse to the work direction F.

The lateral surface 16 can have a flared profile that narrows from the upper aperture 15 toward the aperture 14. Advantageously, the lateral surface 16 has this flared profile only in the proximity of the aperture 14.

In accordance with some embodiments, shown in FIGS. 2-4 and FIGS. 7-8, each of the gripping members 19 comprises at least one support arm 27 provided with one or more of the holding seatings 13. The holding seatings 13 of respective support arms 27 of the gripping members 19 can be identical to each other, or different, according to requirements.

In some embodiments, which can be combined with all the embodiments described here, each movement device 18 comprises a support member 24 associated with the reference surface 22. In possible implementations, each of these support members 24 can have the form of a plate, or a tile or other desired shape. For example, these support members 24 can have a regular or irregular polygonal base, that is, plan, in particular quadrangular, for example square or rectangular, or other polygonal shapes and possibly non-regular polygonal shapes, defined by a closed broken line that defines a shaped profile.

In accordance with some embodiments, the support members 24 can provide anchoring holes disposed in a perimetric manner and in a central zone of each support member 24, the anchoring holes being configured to receive attachment means for clamping the support arms 27 of each movement device 18 into a specific and desired position.

In accordance with some embodiments, even more than one movement device 18 can be provided, for example two disposed adjacent.

Figure 5:
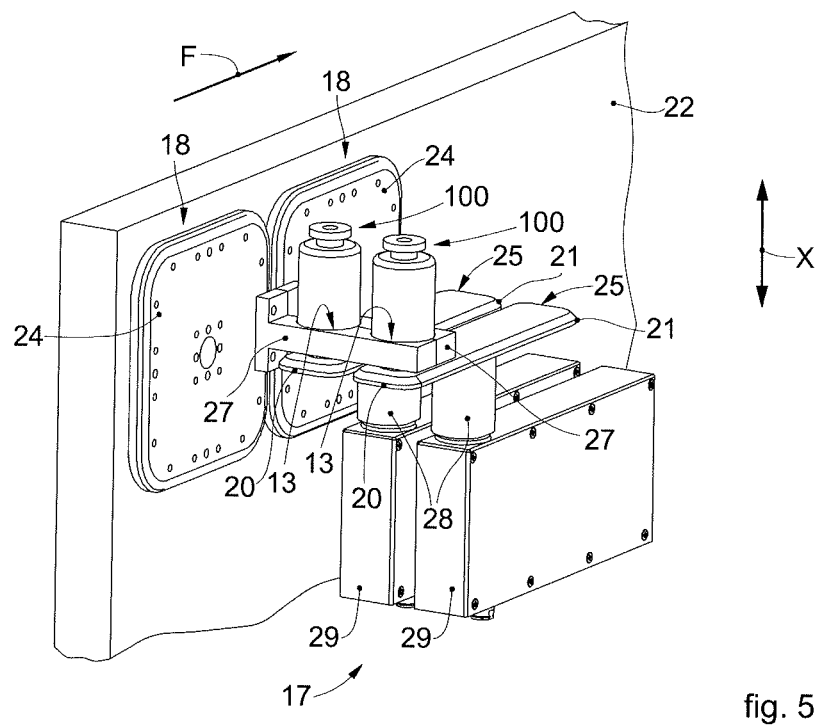

In accordance with some embodiments, shown in FIG. 5 and in FIG. 9, the gripping members 19 of two adjacent movement devices 18 comprise support arms 27 provided with one or more symmetrical holding half-seatings cooperating with each other to define, when aligned and adjacent in contact, the holding seatings 13.

In accordance with some embodiments described here, we will refer, by way of a non-limiting example, to the type of container 100 shown for example in FIG. 6, where the container 100 is represented as a vial. However, as it can be easily ascertained, the embodiments described here can also concern containers 100 of different sizes, shapes and characteristics.

Each container 100 is, in general, provided with a lateral wall, or shell 110 internally delimiting a chamber 110a suitable to contain one or more substances, possibly open or that can be opened upward to allow its filling.

The container 100 can be provided with an upper mouth 111 possibly open at the upper part for the insertion of the product and subsequently sealed in the second station 12B if used for closing/sealing the containers 100.

Preferably, the container 100 has a transverse size, that is the external diameter of the lateral wall 110, which is correlated to the size of the holding seating 13. In particular, in order for the container 100 to be received in the holding seating 13, the lateral wall 110 has a smaller diameter than that of the upper aperture 15 and of the lateral surface 16, but close to the sizes of the upper aperture 15 and of the lateral surface 16 to prevent the container 100 from oscillating during the movement between the work stations 12.

In accordance with some embodiments, the container 100 can comprise the base end 112, positioned on the opposite side with respect to the upper mouth 111, being protruding from the holding seating 13 through the aperture 14 in order to cooperate with the weighing device 17 as described above.

In accordance with some embodiments, shown in FIG. 6, the holding seating 13 defines the holding plane P for the container 100 positioned therein, with respect to which the container 100 can be displaced vertically in the release direction X from a support position to a drawing position.

In the support position, the container 100 is partly protruding downward by a first height H1 and is supported vertically by the gripping member 19.

In the drawing position, when the container advances on the weighing plate 25, the container 100 is partly protruding downward, with respect to the holding seating 13, by a second height H2 smaller than the first height H1, and is supported vertically by the weighing plate 25. In this way, the gripping member 19 guarantees only a constraint in the work direction F. In other words, in the drawing position the container 100 is substantially released by the gripping member 19 which only guarantees a constraint in the work direction F, so that it can continue to advance even while it is weighed. The second height H2 is such that the container 100 is slidingly resting on the weighing plate 25 so that the container 100, in this drawing position, is substantially supported only by the weighing plate 25.

In accordance with some embodiments, in order to engage the container 100 and determine its lifting as described above, the weighing plate 25 of the weighing device 17 can be provided with a shaped edge 20 positioned so as to be intercepted by an advancing container 100, held and moved by the at least one movement device 18, thus cooperating with the base end 112 of the same container 100, in such a way as to lift it vertically with respect to the holding plane P from the support position to the drawing position. In this way, the protruding portion of the container 100 passes from the first height H1 to the second height H2. It should be noted that the protruding portion of the container 100 is equal to the second height H2 when the gripping member 19 is at a weighing distance with respect to the weighing plate 25 which is such as to allow, during weighing, a release of the containers with respect to the gripping member 19 in the release direction X.

The shaped edge 20 can have a beveled stepped or inclined plane profile, to act as a lead-in to intercept the container 100 and determine its gradual lifting, preventing sudden movements or collisions that could cause damage to the container 100 or unwanted movements or oscillations of the product present in the container 100.

In essence, the shape of the shaped edge 20 with a beveled step or an inclined plane determines a conversion of the linear feed motion of the container 100 in the work direction F, into a motion having, in addition to a feed motion component parallel to said work direction F, also a lifting motion component perpendicular to said work direction F, thus passing from the first height H1 to the second height H2. At the end of the shaped edge 20, the motion of the container 100 resting on the weighing plate 25 continues without interruption with a single linear motion component parallel to the work direction F at the height H2, until it meets another shaped edge 21 which, as explained in detail below, in a similar manner determines a lowering of the container 100 from the second height H2 to the first height H1, so that it can then continue aligned with the work direction F.

In accordance with some embodiments, shown in FIGS. 6-6a, the weighing plate 25 is provided at the upper part with a support plane, or surface L, which is in fact the active surface along which the weighing is carried out configured to temporarily receive the containers 100 resting during their movement in the work direction F. This support plane, or surface, L, has a predefined length W measured in the work direction, which is sufficient to allow the acquisition of the measurement of the mass of the containers while they are moved without interruption on the support plane L by the gripping member 19. In this condition, the container 100 is in the drawing position as above, in which the distance between the support plane L and the holding plane P corresponds to the second height H2. In this drawing position, the container 100 is made to advance, therefore, with all of its mass bearing on the weighing plate 25.

In this way, the weight force of the container 100 is fully exerted on the weighing plate 25 while the movement device 18 makes the same container 100 to be weighed advance along the weighing plate 25. Consequently, the measurement of the mass is carried out in motion, "on the fly", that is, without pauses, and always maintaining the container 100 gripped and fed by means of the gripping member 19.

After the weighing, the same movement device 18 continues to make the container 100 advance toward the second work station 12B in the work direction F. In this way, the weighing time is exploited, which otherwise would not be used for advancement purposes, to continue to make the container 100 advance, thereby improving productivity, at the same time preventing phenomena of so-called oscillations or "sloshing" of the contained product due to repeated pauses and re-starts for weighing that are carried out in the state of the art.

In accordance with possible embodiments, the movement device 18 can perform a combination of vertical movements to allow the one or more containers 100 to cooperate with the weighing device 17. In particular, the movement device 18 can perform at least a first vertical movement to take the one or more containers 100 at a height greater than or equal to the height of the support surface L and a second vertical movement downward to make the container 100 rest on the respective weighing plate 25.

In particular, the fact that the container 100 is constantly held by the gripping members 19 of the movement device 18 and that the latter is fed without interruptions in the work direction F, allows to considerably reduce the work times, since the container 100 is always in motion. Furthermore, the continuous movement of the container 100 allows to prevent accelerations/decelerations which could cause product spillage from the container 100 or long stabilization times of the measurement.

In accordance with some embodiments, the weighing device 17 is configured to carry out in sequence a plurality of detections of the weight of the container 100 as it advances on the weighing plate 25; the average of the detections acquired, after a first possible over-elongation, provides the weight value determined in accordance with the present invention. Possibly, the influence of the frictional force between container 100 and weighing plate 25 is modeled and taken into consideration to further refine the measurement of the weight force. In this way, it is therefore possible to weigh the one or more containers 100 "on the fly", that is, without pauses, while they are fed from one work station 12 to the other. Advantageously, the length W of the support surface L is such as to allow the weighing device 17 to carry out a plurality of samplings of the mass of the container 100, which can be used to obtain an average value, for example an arithmetic average value, of the weight of the container 100 and/or of the product contained therein.

As indicated above, in accordance with some embodiments, the weighing plate 25 is provided with another shaped edge 21, opposite the shaped edge 20 and with a shape mating therewith, advantageously a downwardly inclined plane shape, which is conformed and positioned so as to allow a gradual disengagement of the base end 112 of the container 100. In this way, once the weighing is finished, the container 100 translates vertically downward with respect to the holding plane P from the drawing position to the support position, and consequently the protruding portion of the container 100 passes from the second height H2 to the first height H1.

In accordance with some embodiments, the weighing device 17 comprises suitable scales able to measure weight, or similar means for measuring weight. For example, such scales can comprise at least one support mean 28 which supports the weighing plate 25 and which projects from weight measuring means 29. The weight measuring means 29 are advantageously used to process the plurality of weight detections carried out while the container 100 advances in the work direction F, as described above.

In possible embodiments, the weighing device 17 can include a load cell, for example a load cell with extensometer, a hydraulic or hydrostatic load cell, a piezoelectric load cell, a vibrating wire load cell, a magnetic force compensation load cell or a capacitive load cell.

In accordance with some embodiments, the holding plane P defined by the bottom aperture 14 of the holding seating 13 is substantially parallel to the support plane L and disposed above the latter, at least when the container 100 is in the drawing position.

The present invention provides that the movement devices 18 are configured to automatically grip and transport one or more containers 100 along the machine 10, for example in the work direction F, according to desired paths or directions, for example to carry out a desired work cycle as a function of the work stations 12 which are specifically provided or used.

In accordance with possible embodiments, the movement devices 18 can comprise electromechanical, electric or magnetic movement devices, such as for example trolleys, sliders, slides, shuttles or other movement members, which are sliding, for example, with respect to guides, rails or tracks defining a movement path in the work direction F. The containers 100 are moved in this manner, with respect to the reference surface 22, between the various work stations 12 where they can be picked up, filled, packaged and stored, and generally processed.

In accordance with other possible embodiments, the movement devices 18 can comprise robotic automated devices, for example anthropomorphic, comprising one or more articulated mechanical arms, possibly robotic, configured to manipulate the containers 100 in order to pick them up and move them from one work station 12 to the other and possibly also within the individual work stations 12 in aid of the individual operations envisaged.

In accordance with still further possible embodiments, the movement devices 18 can comprise mechanical and motorized transport devices or equipment, which comprise, for example, conveyor belts, turntables or carousels, gears, chains, slides, lifters or other devices known to a person of skill in the art.

In accordance with still further embodiments, shown in FIGS. 2-9, the movement devices 18 can comprise magnetic movement devices 18 of the contactless type. Advantageously, these magnetic movement devices 18 of the contactless type allow to move the containers 100 on the reference surface 22, whether it be vertical (FIGS. 1-5), horizontal (FIGS. 7-9) or otherwise inclined or shaped, with no constraint in direction or path, independent and without generation of particulate due to rubbing, guaranteeing a safe and clean environment, particularly required in the pharmaceutical packaging sector.

The reference surface 22 provides, in correspondence with the free zone between the first work station 12A and the second work station 12B, the at least one weighing device 17 which can be associated with the reference surface 22 or positioned immediately close to the latter.

In accordance with some embodiments, therefore, the movement devices 18 are configured magnetically mobile without contact on the reference surface 22 to transport one or more containers 100 from and toward one or more of the work stations 12 and to move the containers 100 resting along the respective weighing plate 25 of the weighing device 17.

In these embodiments, electrical energizing means are associated with the reference surface 22, of a known type and not shown in detail, which are configured to selectively generate one or more magnetic fields, even locally distributed, in determinate zones of the same reference surface 22. For example, the electrical energizing means comprise a plurality of coils, not shown in the drawings, suitably disposed in correspondence with the reference surface 22.

In accordance with some embodiments, the support members 24 of the movement devices 18 with contactless movement described here can comprise magnetic drive "planar motors", which are known in the state of the art. In some embodiments, each of these support members 24 is provided with magnetic means, such as for example permanent magnets, of a known type and not shown in detail in the drawings. The magnetic means are configured to interact with one or more of the magnetic fields generated by the electrical energizing means associated with the reference surface 22, so that each of the support members 24 can move independently on the reference surface 22 and slightly distanced with respect thereto, therefore without contact, along the machine 10, for example from and toward one or more work stations 12, or in different positions within a same work station 12. In other words, thanks to the magnetic group comprised in the movement device 18, the latter is driven in motion thanks to the magnetic interaction with the magnetic field generated by a stator provided in the reference surface 22, on which the movement device 18 is mobile.

The support members 24 are disposed on the reference surface 22 and configured to be moved and/or rotated, as well as independently and without contact, also with no constraint in path or direction, advantageously in several degrees of freedom, in this specific case being able be moved and/or rotated potentially in six degrees of freedom.

These six degrees of freedom can be along three directions of a set of three orthogonal reference directions, similarly to a set of three Cartesian axes, and angularly around each of the directions of the set of three. Therefore, these support members 24 can be moved or rotated in at least two or more degrees of freedom, for example even three, four, five or six degrees of freedom, also providing combined movements in more of such degrees of freedom, according to requirements. Therefore, the movement devices 18 provided with such support members 24 are able to move without contact in accordance with the degrees of freedom described above.

In accordance with some embodiments, the selective energizing of the electrical energizing means is controlled by control means which can comprise a central processing unit 26 (FIG. 1), such as for example a microcontroller, an industrial PC or a PLC (Programmable Logic Controller), also of a known type and programmable on the basis of the state of the art with reference to so-called planar motors, which have been studied and developed for over twenty years. In particular, the central processing unit 26 selectively controls in a programmed manner the electric current and/or voltage values to be supplied to the electrical energizing means, so that these can determine both the support of each support member 24 in a determinate position of the reference surface 22, and also the selective movement of each support member 24 along the machine 10, for example from one point to another of the same reference surface 22, both from and toward one or the other of the work stations 12.

Figure 2:
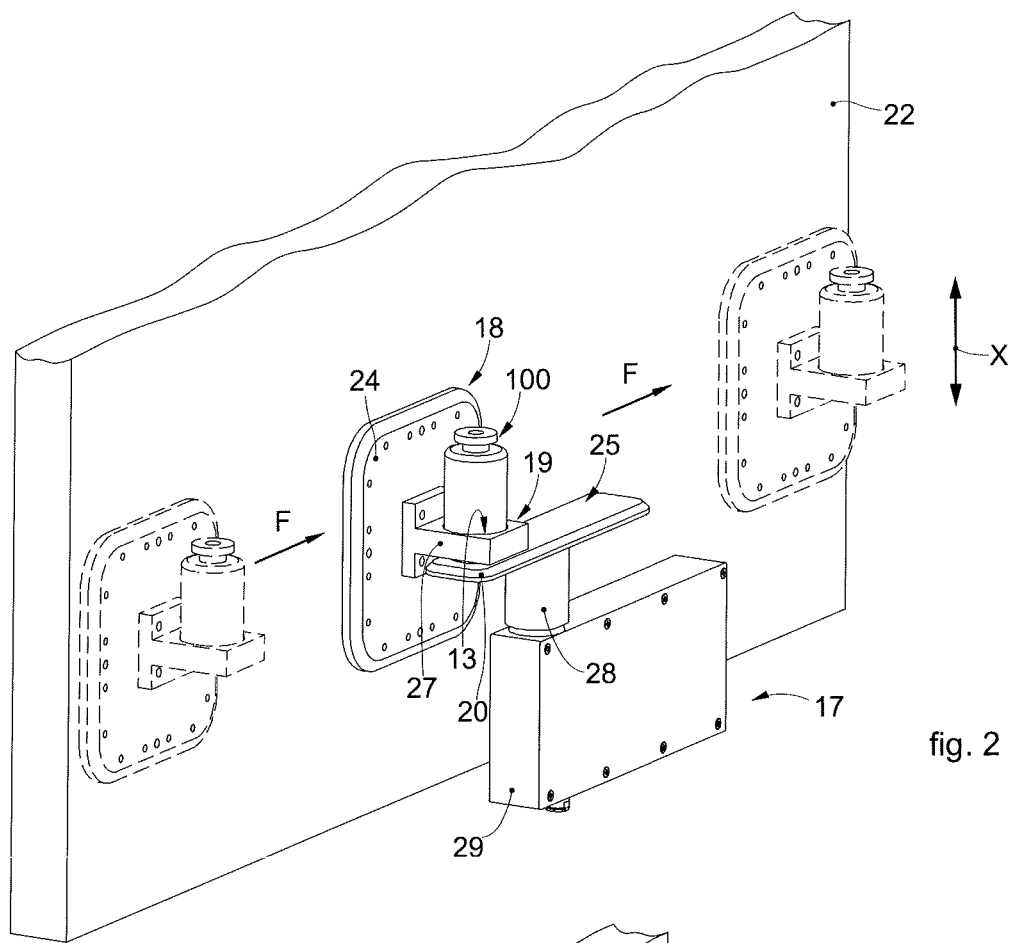
FIGS. 2-5 are perspective views of the weighing zone of FIG. 1, in accordance with different embodiments described here.
Figure 3:
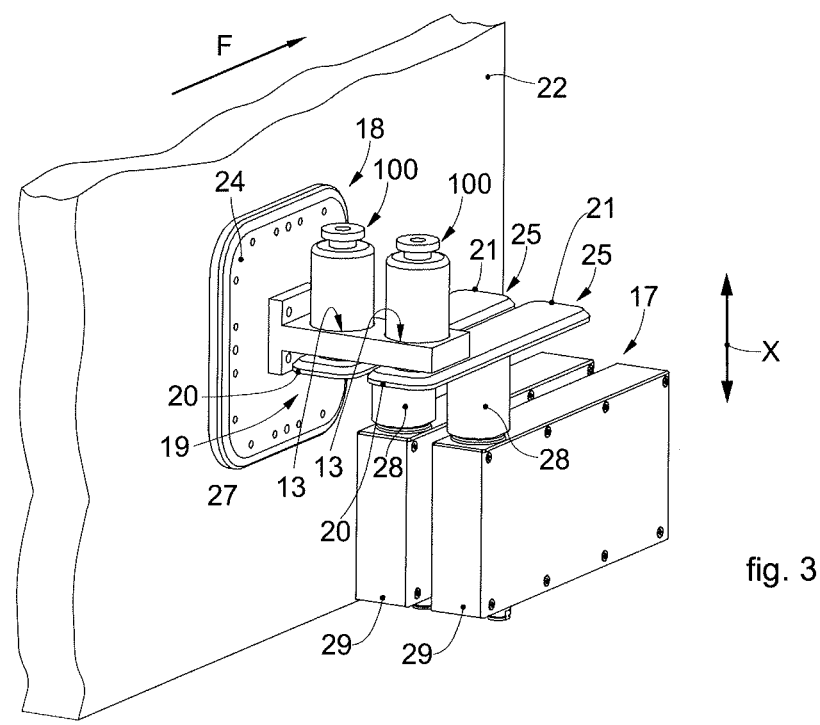

In accordance with some embodiments, shown in FIGS. 2-3, the reference surface 22 is vertical and each movement device 18 is provided with a respective gripping member 19 the support atm 27 of which protrudes cantilevered from the respective support member 24 to which it is attached, for example, by means of mechanical attachment means of a known type and not shown. In the example of FIG. 2, the support arm 27 is provided with a single holding seating 13 to support the container 100.

In particular, in the example of FIG. 3, the support arm 27 is, on the other hand, provided with two identical holding seatings 13, aligned in a direction substantially orthogonal to the reference surface 22, so that one of them is closer to the holding surface 22 and the other is more distanced from the reference surface 22. In the embodiment shown in FIG. 3, the weighing device 17 comprises two weighing plates 25 distanced from the reference surface 22, so as to correspond vertically to a respective container 100 disposed in one of the two holding seatings 13 provided according to the configuration as defined above. Each weighing plate 25 is supported at the lower part by its own support mean 28 which is in turn anchored to a respective measuring mean 29.

Figure 4:
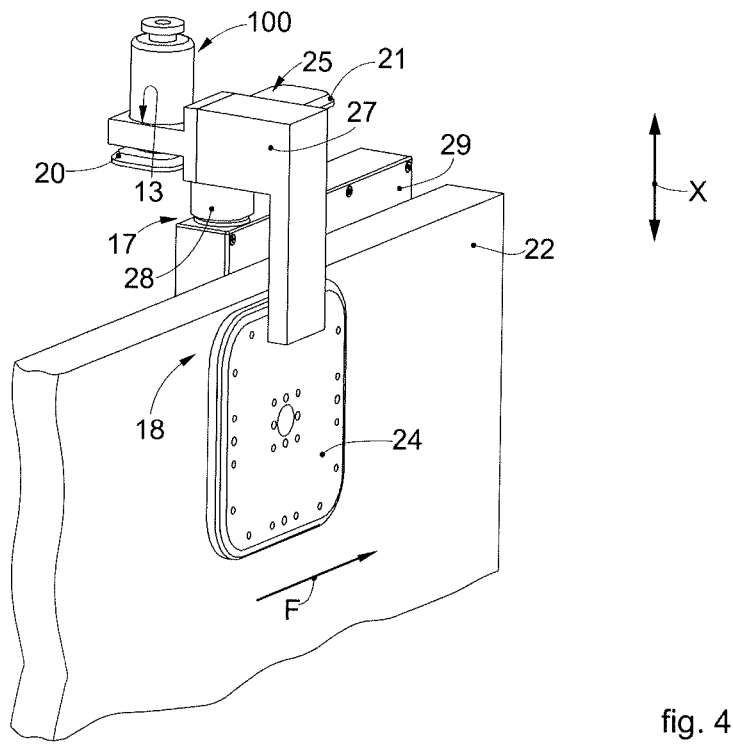

In accordance with some embodiments, shown in FIG. 4, the weighing device 17 can be disposed cantilevered and associated with a support surface opposite the reference surface 22. In this case, the weighing device 17 is positioned in correspondence with a perimeter edge between the reference surface 22 and the opposite support surface. In the example described here, the support arm 27 is protruding cantilevered from the respective support member 24 so as to be projecting from the reference surface 22 toward the opposite support surface, positioning itself astride said perimeter edge.

In accordance with the embodiment shown in FIG. 5, a pair of movement devices 18 can also be provided, each of which is equipped with a support arm 27 provided with a pair of holding half-seatings which, when adjacent and aligned with each other, define a pair of holding seatings 13 as described above. In this case, the support arms 27 are connected to the support member 24 in a decentralized position, preferably in correspondence with a perimeter edge of the support member 24, so as to cooperate more easily with the support arm 27 of the adjacent movement device 18. This conformation of the support arms 27 is advantageous because it allows to grasp and release the containers 100 possibly without the aid of further gripping means.

In accordance with some embodiments, shown in FIGS. 7-9, the reference surface 22 is horizontal and each movement device 18 is provided with a respective gripping member 19 the support arm 27 of which protrudes cantilevered with respect to a perimeter edge of said reference surface 22 in correspondence with which there is positioned a weighing device 17.

In particular, in the example of FIG. 7, the support arm 27 is provided with a single holding seating 13 to support the container 100.

In the example of FIG. 8, the support arm 27 is provided with two identical holding seatings 13, adjacent with respect to the perimeter edge of the reference surface 22 as above, so that one of these is closer to the holding surface 22 and the other is more distanced from the reference surface 22. In the embodiment shown in FIG. 8, the weighing device 17 comprises two weighing plates 25 distanced from the reference surface 22 so as to correspond to a respective container 100 disposed in one of the two holding seatings 13 disposed according to the configuration as defined above.

In accordance with the embodiment shown in FIG. 9, a pair of movement devices 18 is provided, each of which is equipped with a support arm 27 provided with a pair of holding half-seatings which, when adjacent and aligned with each other, define a pair of respective holding seatings 13 as described above. In this case, the support arms 27 are connected to the support member 24 in correspondence with a perimeter edge of the support member 24 so as to cooperate more easily with the support arm 27 of the adjacent movement device 18.

Embodiments described here also concern a method to weigh containers 100 in a machine 10 to fill and weigh containers 100. The method provides that one or more containers 100 are moved, by means of a respective movement device 18, between at least two work stations 12 disposed in the work direction F which defines the movement path between the two work stations 12, at least one of which is suitable for filling the containers 100.

In accordance with one aspect of the present invention, the method comprises weighing, by means of the weighing device 17 disposed along the movement path, one or more of the containers 100 as they advance in the work direction F. The weighing of the one or more containers 100 is carried out while the one or more containers 100 are made to advance without interruption on the weighing plate 25 of the weighing device 17. While they slide on the weighing plate 25 in the work direction F, the one or more containers 100 are held in a drawing position by the respective gripping members 19 of the at least one movement device 18.

In accordance with some embodiments, shown in FIGS. 2, 6 and 7, the method provides that, during the weighing, the container 100 is lifted from the weighing plate 25 from a first height H1, defining a first distance between said base end 112 and a holding plane P of the gripping member 19 to a second height H2, smaller than the first height H1, defining a second distance, also defined weighing distance, between the base end 112 and the holding plane P.

In accordance with some embodiments, it is provided to carry out in sequence a plurality of detections of the mass of the one or more containers 100, such detections being processed by a processor in order to determine the weight of the one or more containers 100, as described above.

It is clear that modifications and/or additions of parts or steps may be made to the machine to fill and weigh containers and corresponding weighing method as described heretofore, without departing from the field and scope of the present invention.

It is also clear that, although the present invention has been described with reference to some specific examples, a person of skill in the art shall certainly be able to achieve many other equivalent forms of a machine to fill and weigh containers and corresponding weighing method, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. Machine to fill and weigh containers, said machine comprising at least one movement device configured to transport one or more containers between at least two work stations disposed in a work direction which defines a movement path between said at least two work stations, at least one of said work stations being suitable to fill the containers, and at least one weighing device comprising a weighing plate disposed along said movement path and configured to acquire the measurement of a mass during a weighing step, said at least one movement device comprising at least one gripping member configured to support and hold said one or more containers along said movement path, characterized in that said movement device is configured to be moved without interruption in said work direction while said one or more containers are weighed, supported by said gripping member, on said weighing plate, said gripping member disposing itself at a weighing distance with respect to said weighing plate such as to allow, during the weighing, a release of said one or more containers with respect to said at least one gripping member in a release direction substantially perpendicular to a support plane of said weighing plate, said gripping member being configured to apply a thrust against said one or more containers supported by said gripping member in the work direction during the weighing of said one or more containers obtained while said movement device moves without interruption on the weighing plate.

2. Machine as in claim 1, characterized in that said at least one gripping member is provided with at least one holding seating with an aperture through which protrudes a part of each container to be weighed, said weighing plate being configured and disposed to support a base end of the container when said movement device is moved without interruption on said weighing plate.

3. Machine as in claim 2, characterized in that said holding seating defines a holding plane for the container positioned therein, the container being vertically mobile in said release direction from a support position, in which said container is partly protruding downward by a first height with respect to said holding plane and is supported vertically by the gripping member, to a drawing position, when the container advances on the weighing plate, in which said container is partly protruding downward by a second height, with respect to said holding plane, smaller than said first height, and is vertically supported by the weighing plate, so that said gripping member only guarantees a constraint in the work direction, said second height being obtained when said gripping member is at said weighing distance with respect to said weighing plate.

4. Machine as in claim 3, characterized in that said weighing plate is provided with an edge positioned and configured to cooperate with the base end of said container so as to lift it vertically with respect to said holding plane from said support position to said drawing position.

5. Machine as in claim 1, characterized in that said release direction is substantially vertical and the release of said one or more containers occurs by lifting them with respect to said gripping member.

6. Machine as in claim 3, characterized in that said support plane has a predefined length in said work direction, sufficient to allow to acquire the measurement of the mass of said one or more containers while they are moved without interruption on said support plane by the movement device.

7. Machine as in claim 6, characterized in that said holding plane is substantially parallel to, and disposed above, the support plane at least when the container is in the drawing position.

8. Machine as in claim 1, characterized in that said movement device is configured to move at a constant speed during the weighing of said one or more containers.

9. Machine as in claim 1, characterized in that said at least one movement device comprises a magnetic unit to generate a magnetic field in order to interact magnetically with another magnetic field generated by a stator of a reference surface on which said movement device is mobile.

10. Assembly to fill and weigh containers, comprising:
one or more containers each having a base end;
at least one movement device configured to transport said one or more containers between at least two work stations disposed in a work direction which defines a movement path between said at least two work stations, at least one of said work stations being suitable to fill the containers, said at least one movement device comprising at least one gripping member configured to support and hold said one or more containers, along said movement path;
at least one weighing device comprising a weighing plate disposed along said movement path and configured to acquire the measurement of a mass during a weighing step;
characterized in that said movement device is configured to be moved without interruption in said work direction while the weighing of said one or more containers is carried out, supported by the gripping member, on said weighing plate, said weighing plate being configured to cooperate with said base end so that during the weighing said one or more containers are released by said at least one gripping member in a release direction substantially perpendicular to a support plane of said weighing plate, said gripping member being configured to apply a thrust against said one or more containers, supported by said gripping member, in the work direction during the weighing of said one or more containers obtained while said movement device moves without interruption on the weighing plate.

11. Assembly as in claim 10, characterized in that said weighing plate is disposed and configured to lift the container during the weighing from a first height, defining a first distance between said base end and a holding plane of said gripping member, to a second height, smaller than said first height, defining a second distance between said base end and the holding plane.

12. Method to weigh containers in a machine to fill containers, said method providing the steps of:
moving one or more containers that have a respective base end by means of at least one movement device, between at least two work stations disposed in a work direction which defines a movement path between said two work stations, at least one of said work stations being suitable to fill the containers, said one or more containers being held by at least one gripping member of said at least one movement device;
weighing, by means of a weighing device disposed along said movement path, said one or more containers, making them advance along said movement path on a weighing plate of said weighing device;
said method being characterized in that in said weighing step, said one or more containers, supported by said at least one gripping member, are moved without interruption in said work direction by means of said at least one movement device, said one or more containers cooperating with said weighing plate so that during the weighing they are released by said at least one gripping member in a release direction substantially perpendicular to a support plane of said weighing plate, so as to acquire the measurement of the mass while said one or more containers are made to advance without interruption on said weighing plate in said work direction, said at least one gripping member thrusting said one or more containers, supported by said gripping member, in said work direction during the weighing of said one or more containers obtained while said movement device moves without interruption on the weighing plate.

13. Method as in claim 12, characterized in that, during the weighing, said container is lifted from said weighing plate from a first height, defining a first distance between said base end and a holding plane of said gripping member, to a second height, smaller than said first height, defining a second distance, also defined weighing distance, between said base end and the holding plane.

14. Method as in claim 12, characterized in that during said weighing step a plurality of detections of the weight of said one or more containers is carried out in sequence, said detections being processed by a processor to determine the weight of said one or more containers.

15. Method as in claim 12, characterized in that it provides to generate a magnetic field by means of a magnetic unit comprised in said at least one movement device, wherein the magnetic field interacts magnetically with another magnetic field generated by a stator of a reference surface on which said movement device is mobile.

\* \* \* \* \*